United States Patent
Dezonno et al.

(10) Patent No.: US 7,206,400 B2
(45) Date of Patent: Apr. 17, 2007

(54) METHOD AND SYSTEM FOR DATA FIELD REUSE

(75) Inventors: Anthony J. Dezonno, Bloomingdale, IL (US); Craig R. Shambaugh, Wheaton, IL (US)

(73) Assignee: Rockwell Electronic Commerce Corp., Wood Dale, IL (US)

(*) Notice: Subject to any disclaimer, the term of this patent is extended or adjusted under 35 U.S.C. 154(b) by 410 days.

(21) Appl. No.: 09/997,754

(22) Filed: Nov. 30, 2001

(65) Prior Publication Data

US 2003/0103616 A1   Jun. 5, 2003

(51) Int. Cl.
*H04B 1/10* (2006.01)

(52) U.S. Cl. .............. 379/221.09; 379/221.11; 379/221.1; 379/221.08

(58) Field of Classification Search ............ 265/1, 265/2; 266/1
See application file for complete search history.

(56) References Cited

U.S. PATENT DOCUMENTS

| | | | |
|---|---|---|---|
| 5,127,004 A | 6/1992 | Lenihan et al. | 370/525 |
| 5,140,611 A | 8/1992 | Jones et al. | 375/219 |
| 5,268,903 A | 12/1993 | Jones et al. | 370/384 |
| 5,511,117 A | 4/1996 | Zazzera | 379/265.03 |
| 5,555,179 A | 9/1996 | Koyama et al. | |
| 5,715,307 A | 2/1998 | Zazzera | 379/265.03 |
| 5,765,033 A | 6/1998 | Miloslavsky | |
| 5,901,215 A | 5/1999 | Dezonno | 379/266.1 |
| 5,907,611 A | 5/1999 | Dezonno et al. | 379/266.1 |
| 5,910,983 A | 6/1999 | Dezonno et al. | 379/26.04 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,046,994 A * | 4/2000 | Fechalos et al. | 370/366 |
| 6,067,357 A | 5/2000 | Kishinsky et al. | |
| 6,097,806 A | 8/2000 | Baker et al. | 379/265.12 |
| 6,108,711 A | 8/2000 | Beck et al. | |
| 6,137,870 A * | 10/2000 | Scherer | 379/127.06 |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,181,366 B1 | 1/2001 | Dezonno et al. | 348/14.11 |

(Continued)

Primary Examiner—Wing Chan
Assistant Examiner—Karen Le
(74) Attorney, Agent, or Firm—Welsh & Katz, Ltd.

(57) ABSTRACT

An automatic call distribution system is adapted to connect a telephone call of a caller to an agent station through a public switched telephone network (PSTN) where call information identifiers received from the PSTN are repopulated. The method includes the steps of receiving the incoming telephone from the PSTN, transferring the incoming call to a voice response unit (VRU), requesting, by the VRU, predetermined data from the caller, receiving, by the VRU, the requested predetermined data, repopulating a portion of the call information identifiers with repopulated data corresponding to the predetermined data, transferring the incoming telephone call back to the automatic call distribution system from the VRU along with the repopulated data retained within the call information identifiers, routing the transferred call to the agent station, displaying the repopulated data.

39 Claims, 4 Drawing Sheets

U.S. PATENT DOCUMENTS

| | | |
|---|---|---|
| 6,185,292 B1 | 2/2001 | Miloslavsky |
| 6,233,333 B1 | 5/2001 | Dezonmo ................ 379/266.1 |
| 6,289,373 B1 | 9/2001 | Dezonno .................... 709/206 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,704,410 B1 * | 3/2004 | McFarlane et al. .... 379/265.05 |
| 6,732,156 B2 | 5/2004 | Miloslavsky |
| 6,940,962 B1 * | 9/2005 | Hansen et al. ......... 379/265.02 |
| 2006/0018441 A1 * | 1/2006 | Timmins et al. ......... 379/88.12 |

* cited by examiner

METHOD AND SYSTEM FOR DATA FIELD REUSE

FIELD OF THE INVENTION

The present invention relates generally to a method and system for providing customer data to an agent of an automatic call distribution system, and more specifically to a method and system to remotely collect customer data and transfer the data to the agent.

BACKGROUND

Systems which automatically distribute customer contacts or calls (generically referred to as "ACD") are often employed in telemarketing environments in which agents stationed at agent telephone sets answer many different types of telephone calls and other types of customer contacts (VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, preliminary information is first obtained from the caller or prospective customer before or as the call is routed to the agent of the ACD. This permits the agent to more quickly and efficiently service the call. It is often desirable to obtain the preliminary customer data though an interactive device, such as a voice response unit (VRU) or an interactive voice response unit. In some known ACD systems, the VRU or equivalent unit is incorporated within the ACD or agent station. In such a system, for example, the VRU typically plays a prerecorded message instructing the customer to provide certain information, such as credit card number and the like. The customer responds by depressing the appropriate touch-tone keys of the telephone. The ACD then transfers this preliminary information to the agent display when the call is routed to the agent.

It is also desirable for ACD systems to communication remotely with VRU devices. In this case, the ACD would place a telephone call to the VRU through the public switched telephone network. This adds system redundancy and flexibility. When accessing the VRU remotely, however, there is no suitable facility for transmitting the acquired preliminary customer data back to the ACD. Of course, a second telephone line could be used to transmit the data back to the ACD, but this costly and inefficient. Accordingly, a need exists to permit transmission of preliminary customer data from a remote VRU to an ACD using an existing telephone circuit.

SUMMARY

The disadvantages of present call transaction systems are substantially overcome with the present invention by providing a novel method and system for data field reuse in an automatic call distribution system.

More specifically, in one embodiment of the present invention, an automatic call distribution system is adapted to connect a telephone call of a caller to an agent station through a public switched telephone network (PSTN) where call information identifiers received from the PSTN are repopulated. The method includes the steps of receiving the incoming telephone from the PSTN, transferring the incoming call to a voice response unit (VRU), requesting, by the VRU, predetermined data from the caller, receiving, by the VRU, the requested predetermined data, repopulating a portion of the call information identifiers with repopulated data corresponding to the predetermined data, transferring the incoming telephone call back to the automatic call distribution system from the VRU along with the repopulated data retained within the call information identifiers, routing the transferred call to the agent station, displaying the repopulated data.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
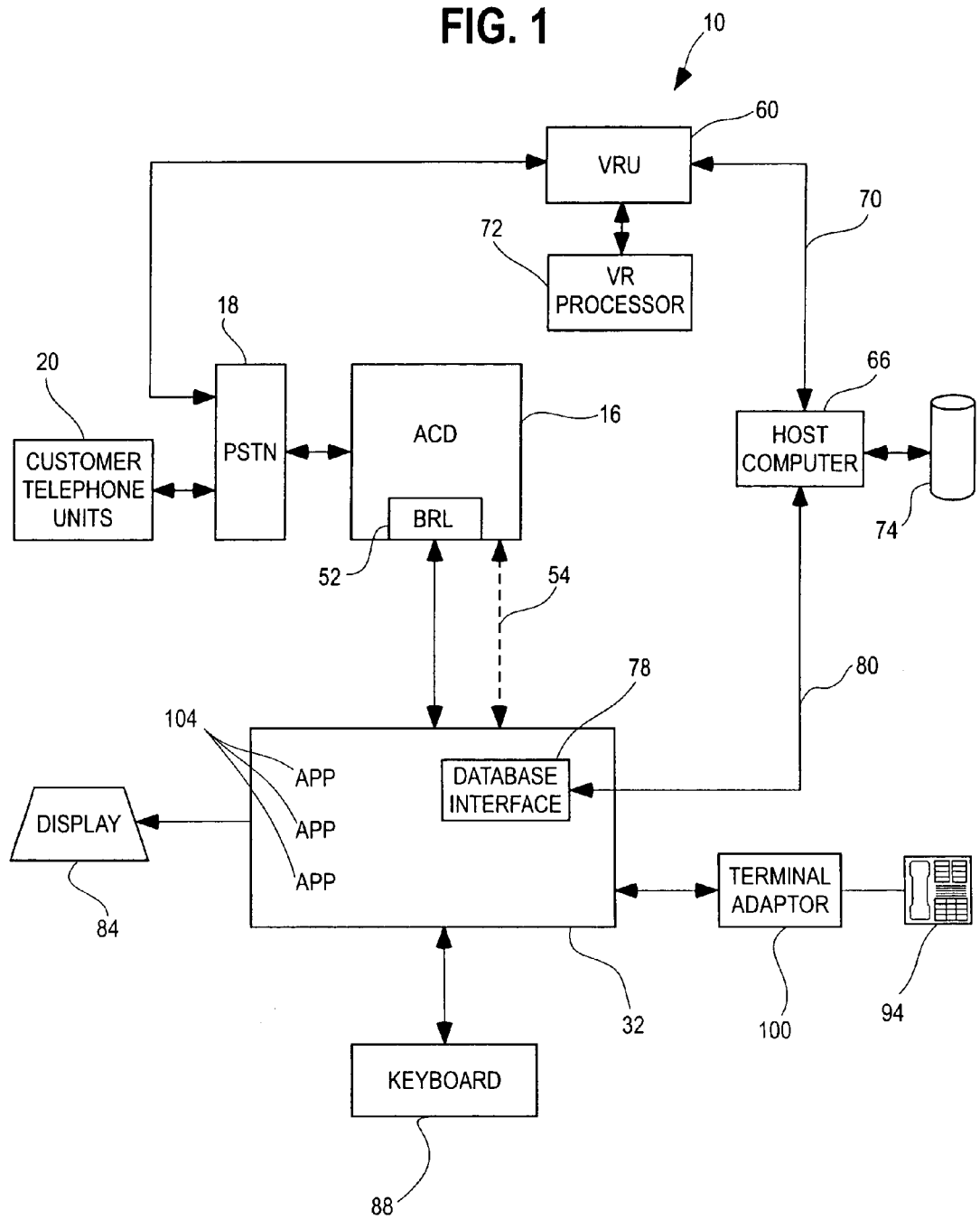
FIG. 1 is a pictorial representation of a specific embodiment of a transaction processing system showing an agent terminal or computer, an exemplary automatic call distributor and a voice response unit.
Figure 2:
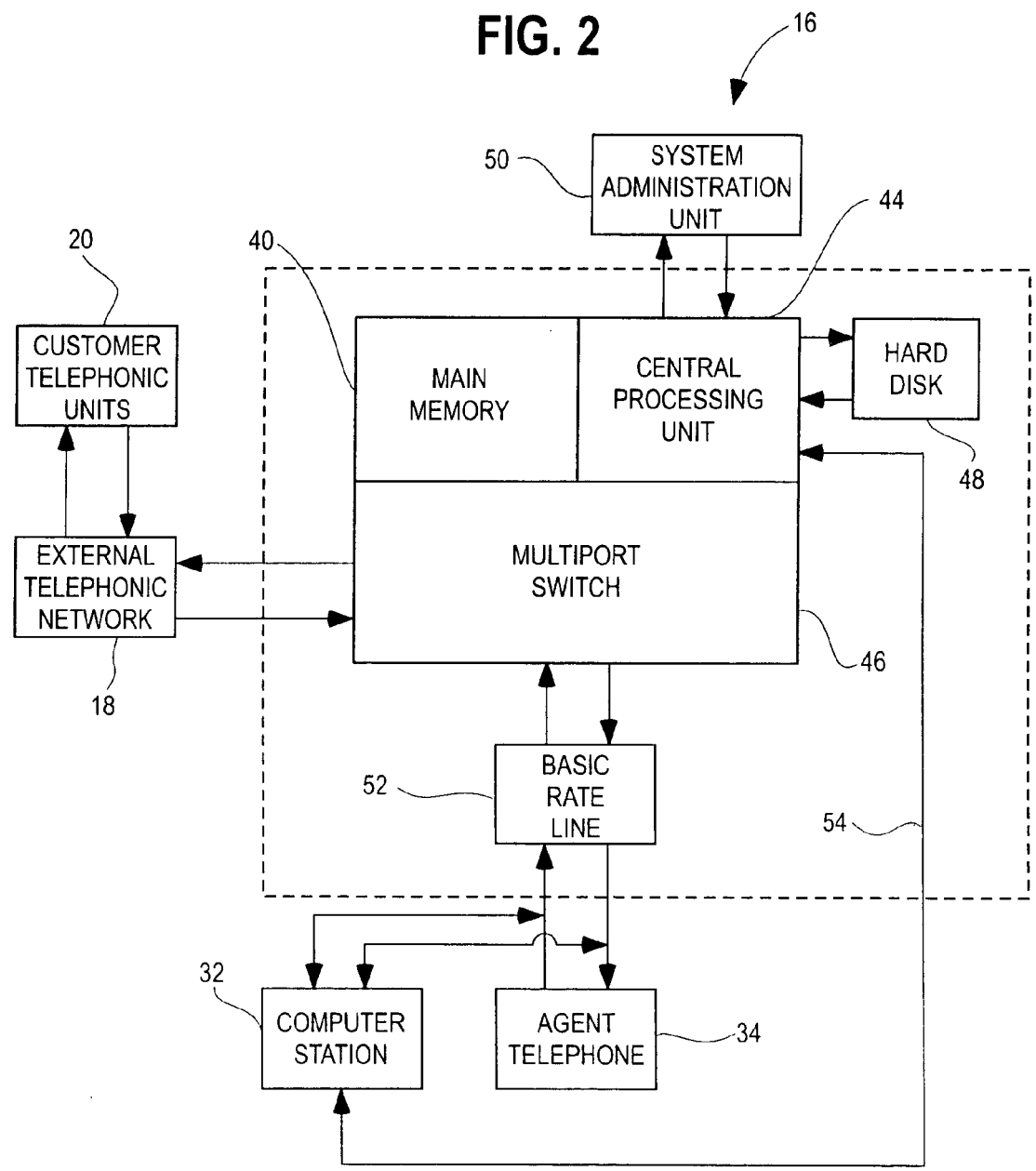
FIG. 2 is a block diagram of a specific example of a known ACD system.

Referring now to FIGS. 1 and 2, FIG. 1 shows an exemplary embodiment of a transaction processing system 10. The transaction processing system 10 includes an automatic call distributor or automatic contact distributor system (ACD or ACD system) 16. A typical ACD system 16 is shown in greater detail in FIG. 2.

The ACD 16 of FIG. 2 facilitates routing of incoming calls or contacts ("transactions") to agents associated with the ACD. The ACD 16 processes both voice-dialog communications or transactions, as well as non-voice dialog communications and transactions. The present invention may be implemented in numerous types and sizes of systems for distributing calls to selected ones of a plurality of agents. One example of an ACD system that may be used in the present invention is the SPECTRUM ACD product, available from Rockwell Electronic Commerce Corp. of Illinois. Another example of an ACD system that may be used in the present invention is the TRANSCEND 3.0 ACD product, also available from Rockwell Electronic Commerce Corp. of Illinois. The ACD 16 may be a single integrated device, or may include distributed hardware and software.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

With respect to FIG. 2, a customer or caller may be connected to the ACD 16 through a public switched telephone network (PSTN) 18, which caller may connect to the PSTN through a standard telephone set or customer telephone 20. However, any suitable computer, cellular telephone, or communication device may be used. Note that the term "caller" as used herein does not necessarily mean that the contact or person using the telephone 20, for example, initiated the call to the agent. Notably, the agent may have initiated the call to the contact. Accordingly, the term "caller" shall broadly refer to the contact or potential customer even though the agent may have originated or initiated the call or contact. Additionally, the term "call" may be a telephone call, or it may be any other form of communication (emails etc.) as set forth above.

In the illustrated embodiment, an agent station or terminal 32 is shown coupled to the ACD 16, but any suitable number of agents may be coupled thereto. The agent station 32 may be a computer or may be coupled to a computer, such as a personal computer and the like. The agent stations 32 may also include agent telephone sets 34 or may only include a headset with speaker and microphone.

The ACD 16 may comprise hardware and/or software and, for example, may include a main memory 40, a central processing unit 44 and a multiport switch 46, each of which may be separate units, distributed components, or integrated at a single location or single cabinet. The multiport switch 46 is coupled to the PSTN 18, which in turn, is connected to the customer telephones 20 or other communication devices. The central processing unit 44 may include storage, such as hard disk storage 48, and may also be coupled to a system administration unit 50. The ACD 16 is connected through a suitable communication link to the plurality of agent telephonic sets 34, for example, through a basic rate line (BRL) 52, as is known in the art. The agent computer station 32 and the agent telephone sets 34 may be incorporated into a single unit, as is known in the art. The BRL 52 generally handles only the voice channel, not data. Accordingly, the agent computer station 32 may also coupled to the central processing unit 44 of the ACD 16 through a local area network (LAN) 54 or other suitable communication link so that data can also be handled.

Referring back to FIG. 1, in one specific embodiment, the ACD 16 may connect to a voice response unit (VRU) 60 and may communicate with the VRU through the PSTN 18. The VRU 60 is preferably separate and apart from the ACD 16, thus, the ACD essentially calls or dials the telephone number of the VRU. This adds redundancy and flexibility to the system 10. For example, if one VRU fails to function properly, another VRU may be easily contacted. The VRU 60 may be operatively coupled to a host computer 66 via a local area network (LAN) 70, as is known in the art. The VRU 60 may also be coupled to a voice recognition processor 72 or software module, as is known in the art.

The host computer 66 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like. The host computer function may also be incorporated in another system processor, e.g., as software running on the processor of the ACD 16. The host computer 66 may access a database 74, which may be remote from the host computer or which may be contained within the host computer data storage system, as is known in the art. The host computer 66 may be further coupled to the agent computer 32 so that data in the database 74 is accessible to the agent computer. The host computer 66 is preferably coupled to a database interface 78 in the agent computer 32 through a local area network (LAN) 80, as is known in the art.

The agent computer 32, for example, may be a "virtual telephone," meaning that the agent need not have access to a conventional telephone. That is, the agent may only require a headset or a speaker and microphone. A display 84 coupled to the agent computer 32 preferably "simulates" all of the functions of a conventional telephone. For example, a telephone dial keypad would appear on the display 84 and the agent would simply touch the appropriate displayed digits to dial. Of course, the agent could type the appropriate digits on an agent computer keyboard 88, as is known in the art. Alternatively, the agent may use a conventional telephone 94, which may be coupled to the agent computer 32 through a terminal adapter 100, as is known in the art.

The agent computer 32 runs various software modules or applications 104 to perform its functions. For example, an application referred to as CONVERGENCE available from Rockwell Electronic Commerce Corp. of Illinois may be used to perform the telephone simulation and provide the "virtual telephone." Other applications handle the various screens or forms displayed to the agent, and process the data entered by the agent.

Figure 3:
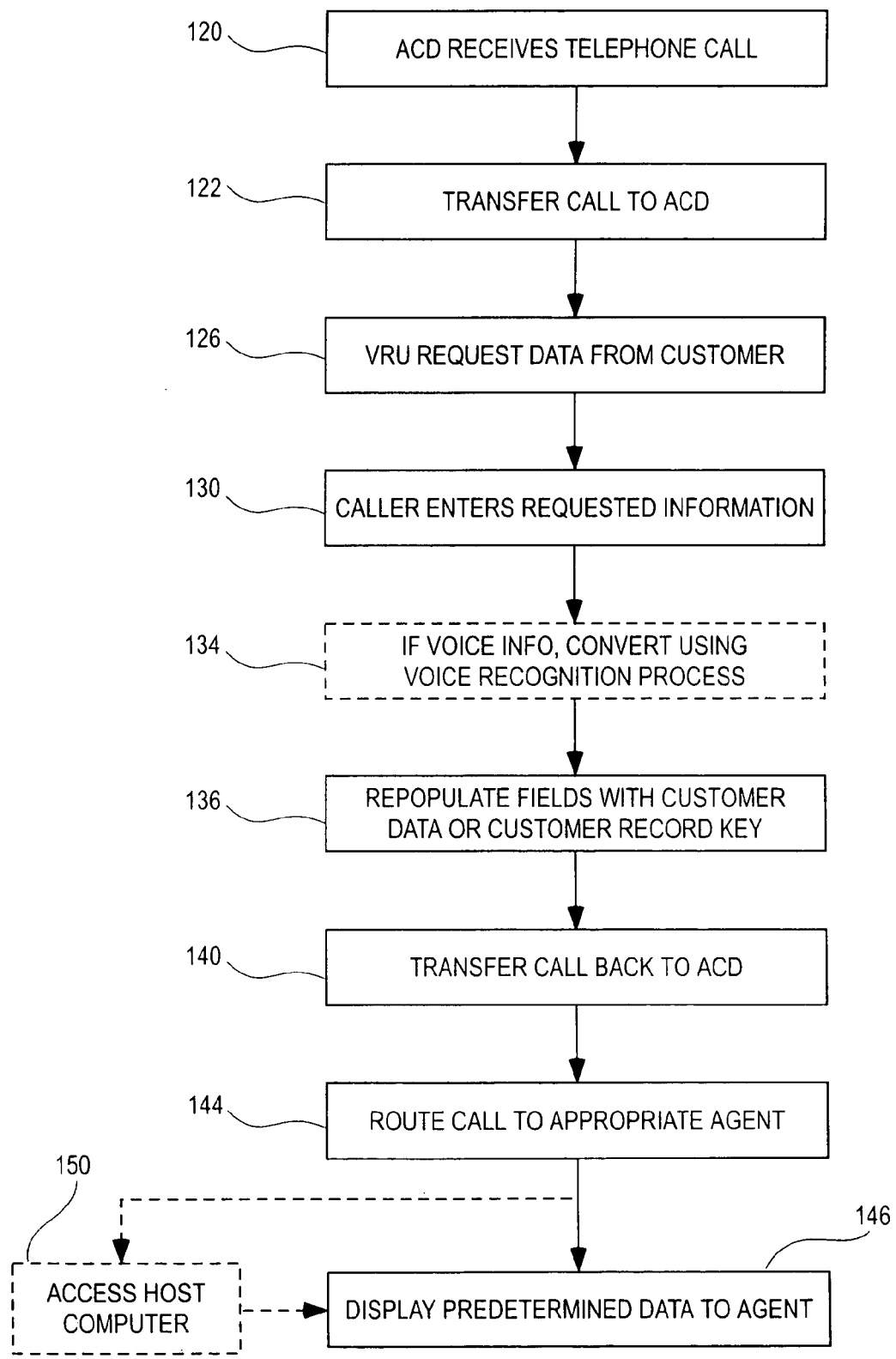
FIG. 3 is a flowchart of a specific embodiment of a method for repopulating call information identifiers with data obtained by a remote voice response unit.

Referring now to FIGS. 1 and 3, in one specific embodiment, the automatic call distribution system 16 receives an incoming telephone call via the PSTN 18, as shown in a step 120. Before the incoming telephone call is routed to a suitable agent, the call is first transferred to the VRU 60, as shown in a step 122. Note that the incoming telephone call preferably includes ANI (automatic number identification) fields and DNIS (dialed number information service) fields, as is known in the art. Preferably, the ANI and DNIS fields are each at least twelve characters in length, but may be larger or smaller depending upon the subscription that the user has purchased. For purposes of illustration, these fields are referred to as call information identifiers, and may consist of the ANI and/or the DNIS field.

The VRU 60 may be programmed to request certain information from the caller, which of course, may be changed to accommodate various applications and business environments. Preferably, using a recorded or automated voice message, the VRU 60 requests certain information or predetermined data from the caller, as shown in a step 126. Because the ACD 16 transferred the incoming telephone call to the VRU 60, a voice channel between the VRU and the caller exists. For example, the VRU 60 may ask the caller to provide his or her social security number, credit card number, account number, and the like. Using the telephone keypad, the caller may respond by typing in the digits corresponding to the request, as shown in a step 130. Of course, the VRU 60 is not limited in the kind of data that may be requested from the caller, and the term "predetermined data" does not mean that the type of data cannot be changed. To the contrary, the predetermined data requested by the VRU 60 may change frequently, and may even vary depending upon the identity of the caller.

Alternatively, the caller may elect to speak the information rather than to use the key pad. In that case, the voice recognition processor 72 or commercially available voice recognition software, as is known in the art, may be used to decode the caller's spoken response and convert the response into the appropriate digits, as shown in a step 134 in dashed lines. For example, it is awkward to obtain alphanumeric characters, such as the letters of the caller's name or address, through the caller's touch-tone key pad because several keys must be depressed to identify a single letter. Callers are generally impatient with this approach and tend not to complete the call.

In either case, the VRU 60 receives the requested predetermined data from the caller. The VRU 60 next repopulates the call information identifiers with the predetermined data, as shown in a step 136. Repopulation of the call information identifiers, of course, overwrites the information in the call information identifiers corresponding to the incoming customer telephone call. Accordingly, the VRU 60 may save the call information identifiers (ANI and DNIS data) prior to repopulation. The VRU 60 repopulates the call information identifiers with the predetermined data received from the caller in order to provide the predetermined data back to the ACD 16.

Because the VRU 60 may be separate from the ACD 16, and coupled thereto over the telephone link established between the caller and the ACD, the voice channel to the caller is active. There are few feasible alternatives for transmitting the predetermined data collected by the VRU 60 back to the ACD 16. Of course, DTMF tones could be used to transmit the predetermined data, but this is undesirable because such tones would be audible to the caller. As described above, the VRU 60 could transmit the predetermined data over a second telephone line, but this approach is expensive, complex, and inefficient. Accordingly, under the present method, the customer data or predetermined data obtained by the VRU 60 is inserted into the call information identifiers, which are standard protocol.

In some cases, the length or amount of the predetermined data requested from the caller by the VRU 60 is minimal, and is able to be written into the data fields of the call information identifiers. For example, the caller may enter an eight digit account code and the like. In such a case, the predetermined data may be fully written or saved within the call information identifiers.

In other situations, however, the predetermined data requested and obtained by the VRU 60 may be larger than the call information identifiers, that is, it cannot all fit. In this case, the VRU 60 may access the host computer 66 and obtain from the database 74 a customer record key that identifies the caller. The customer record key may be found based on some of the predetermined data entered by the customer, such as by credit card number or account number. In this case, the customer record key is provided to the VRU 60 by the host computer 66, and the VRU may insert the customer record key into the call information identifiers, as shown in the step 136.

Once the VRU 60 has populated the call information identifiers with the predetermined data or customer data, (or customer record key) the VRU may transfer the telephone call back to the ACD 16, as shown in a step 140. Note that the VRU 60 transfers the telephone call back to the ACD 16, which telephone call contains the call information identifiers repopulated with the predetermined data or customer record key. The ACD 16 then again has control of the incoming call, and may route the call to an appropriate agent, according to known methods, as shown in a step 144. The agent computer 32 may then display the predetermined data or customer data on the display 84 to aid the agent in handling the incoming telephone call, as shown in a step 146.

If the call information identifiers contain the customer record key rather than the actual predetermined data, the agent computer 32 may access the database 74 via the host computer 66, as shown alternatively in dashed lines in a step 150. In such case, the host computer 66 may use the customer record key to access the database 74 and obtain customer data, which is transmitted back to the agent computer 32 and displayed on the display device 84.

Figure 4:
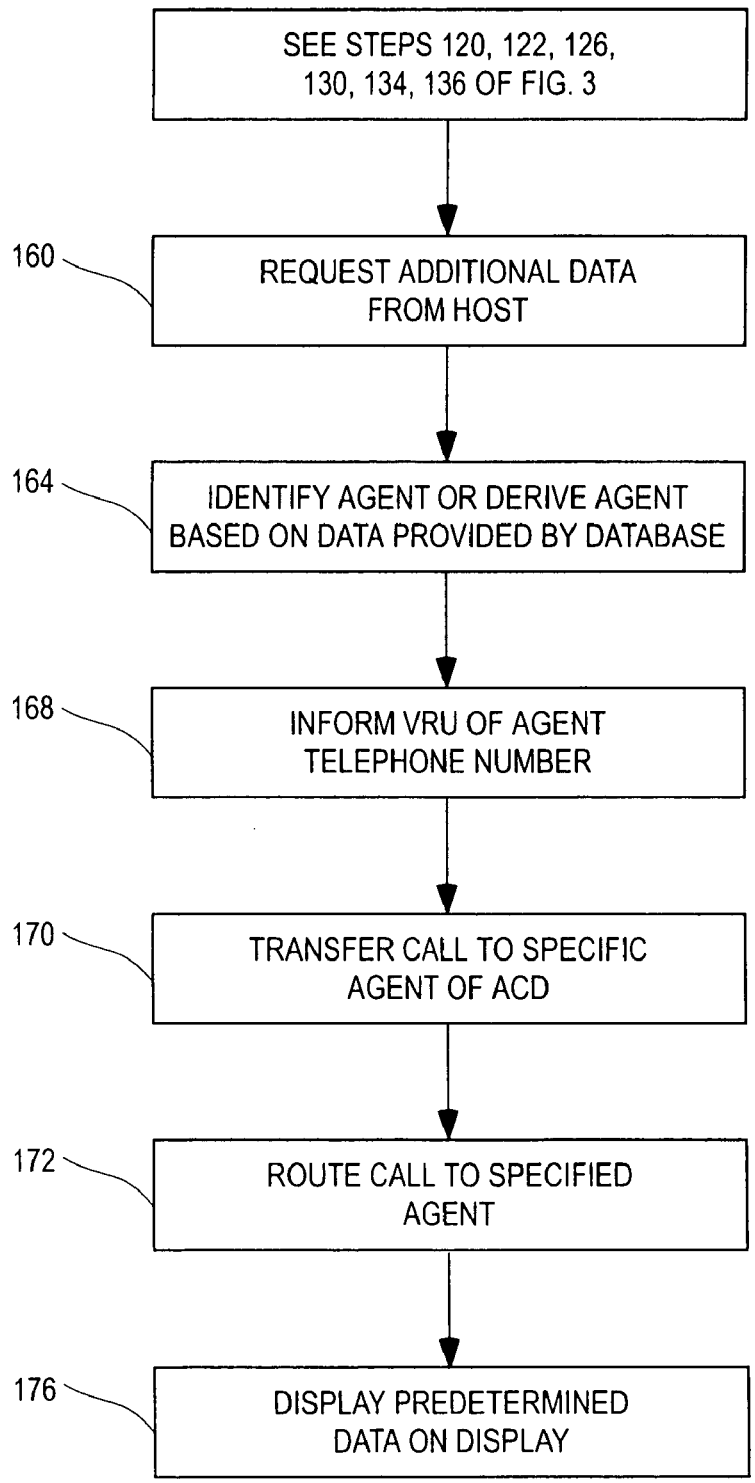
FIG. 4 is a flowchart of a specific alternative method for repopulating call information identifiers with data obtained by a remote voice response unit.

Referring now to FIGS. 1 and 4, FIG. 4 is a flowchart of a specific alternate embodiment according to the present method and system. According to this specific embodiment, some of the steps are the same as the steps set forth in FIG. 3. In particular, the steps 120, 122, 126, 130, 134 and 136 are the same. Accordingly, for purposes of illustration and clarity, those steps shall not be repeated in this description or as shown in FIG. 4. After the VRU 60 has repopulated the call information identifiers with the predetermined data, as previously shown in the step 136, the VRU may request additional data from the host computer 66 based on the predetermined data provided by the caller, as shown in a step 160. For example, the VRU 60 may provide sufficient information to the host computer 66 to permit the host computer to identify the caller. This may permit the host computer 66 to access detailed data from the database 74 corresponding to the caller.

In this regard, there may be specific information in the database 74 with respect to which particular agent of the ACD 16 should handle the call. For example, a particular caller may always want to speak to a specific agent. Alternatively, the host computer 32, after inspecting the detailed data corresponding to the caller, may determine that the caller is delinquent in paying his or her bill. In such case, the host computer 32 may determine or derive that the call should be directed to an agent in the "collections" department. Accordingly, the host computer 32 via the database 74 may provide detailed data about the caller which either identifies a particular agent with whom to connect the caller, or may permit the host computer 66 to derive or identify a particular agent or agent group with whom to connect the caller, as shown in a step 164.

In one embodiment, once a particular agent or agent group has been identified by the host computer 32 as being best suit to handle the call, the host computer may provide the VRU 60 with the telephone number of the identified agent to call, as shown in a step 168. The VRU 60 may then transfer the incoming telephone call directly back to the ACD 16 by dialing the specified agent or agent group telephone number in the ACD 16 identified by the host computer 32, as shown in a step 170. This may, for example, be a "hook-transfer"

type of operation. The ACD 16 may then route the call to the specified agent, as shown in a step 172. As shown in a step 176, the predetermined data or customer data obtained using the customer record key is displayed on the display 84 to aid the agent in handling the incoming telephone call.

Specific embodiments of a method and system for data field reuse according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. In an automatic call distribution system adapted to connect a telephone call of a caller to one of a plurality of agents located at an agent station through a public switched telephone network (PSTN), a method of repopulating call information identifiers received from the PSTN, the method comprising the steps of:
    receiving the incoming telephone call from the PSTN;
    transferring the incoming call to a voice response unit (VRU);
    requesting, by the VRU, predetermined data from the caller;
    receiving, by the VRU, the requested predetermined data;
    overwriting at least a portion of the call information identifiers with transactional data corresponding to the caller, said transactional data defining repopulated data;
    selecting an agent of the plurality of agents to handle the telephone call based upon a business reason derived from the received predetermined data;
    the VRU transferring the incoming telephone call back to the automatic call distribution system from the VRU along with the repopulated data retained within the call information identifiers by dialing a telephone number of the selected agent or selected agent group using a hook transfer type of operation;
    routing the transferred call to the agent station of the selected agent; and
    displaying the repopulated data.

2. The method according to claim 1 wherein the VRU is separate from the automatic call distribution system.

3. The method according to claim 1 wherein the VRU communicates with the automatic call distribution system through the PSTN.

4. The method according to claim 1 further including a host processor operatively coupled to the VRU.

5. The method according to claim 1 further including a database operatively accessible by the VRU.

6. The method according to claim 1 wherein the VRU is programmable so that the transactional data requested of the caller is capable of being modified.

7. The method according to claim 1 wherein the VRU is interactive.

8. The method according to claim 1 wherein the VRU is interactive and requests the transactional data from the caller.

9. The method according to claim 8 wherein the caller provides the transactional data in response to the request by using a touch-tone keypad.

10. The method according to claim 1 wherein the transactional data is selected from the group consisting of account number, credit card number, social security number, name and address.

11. The method according to claim 1 wherein the VRU is operatively coupled to a voice recognition system.

12. The method according to claim 1 wherein the voice call information identifiers are stored prior to overwriting.

13. The method according to claim 12 wherein the voice recognition system is configured to convert the at least one of the name and the address into digital data, said digital data corresponding to the transactional data.

14. The method according to claim 1 wherein the call information identifiers include at least one of an ANI (automatic number identification) field and a DNIS (dialed number information service) field.

15. The method according to claim 1 wherein a length of the transactional data provided by the caller is less than a length of the call information identifiers such that all of the transactional data is received within the call information identifiers.

16. The method according to claim 1 wherein if the transactional data provided by the caller exceeds a storage capacity of the call information identifiers, the repopulated data is in the form of a customer record key corresponding to the transactional data.

17. The method according to claim 16 further including a host processor operatively coupled to the VRU, the host processor providing the VRU with the customer record key.

18. The method according to claim 17 further including a database accessible by the host processor.

19. The method according to claim 16 wherein the repopulated data in the form of the customer record key provided to the agent station permits the agent station to access customer data corresponding to the customer.

20. In an automatic call distribution system adapted to connect a telephone call of a caller to one of a plurality of agents located at an agent station through a public switched telephone network (PSTN), a method of repopulating call information identifiers received from the PSTN, the method comprising the steps of:
    receiving the incoming telephone call from the PSTN;
    transferring the incoming call to a voice response unit (VRU);
    requesting, by the VRU, transactional data from the caller;
    receiving, by the VRU, the requested transactional data;
    overwriting at least a portion of the call information identifiers with transactional data, said transactional data defining repopulated data;
    providing the transactional data to a database to identify customer data corresponding to the caller;
    identifying from the customer data a preferred agent of the plurality of agents located at a station of the preferred agent based upon a business reason derived from the requested transactional data;
    transferring the incoming telephone call from the VRU to the identified preferred agent station of the automatic call distribution system by dialing a telephone number of the preferred agent or preferred agent group using a hook-transfer type of operation, the repopulated data retained within the call information identifiers; and
    displaying the repopulated data.

21. The method according to claim 20 further including a host processor operatively coupled to the VRU.

22. The method according to claim 20 wherein the VRU is interactive and requests the predetermined data from the caller.

23. The method according to claim 20 wherein the transactional data is selected from the group consisting of account number, credit card number, social security number, name and address.

24. The method according to claim 20 wherein the VRU is operatively coupled to a voice recognition system.

25. The method according to claim 20 wherein if the transactional data provided by the caller exceeds a storage capacity of the call information identifiers, the repopulated data is in the form of a customer record key corresponding the transactional data.

26. The method according to claim 25 further including a host processor operatively coupled to the VRU, the host processor providing the VRU with the customer record key.

27. The method according to claim 26 further including a database accessible by the host processor.

28. The method according to claim 25 wherein the repopulated data in the form of the customer record key provided to the agent station permits the agent station to access customer data corresponding to the customer.

29. An automatic call distribution system adapted to connect an incoming telephone call of a caller to one of a plurality of agents located at an agent station through a public switched telephone network (PSTN), the PSTN providing call information identifiers corresponding the incoming telephone call, the system comprising:
    an transaction processor configured to receive the incoming telephone call from the PSTN;
    a voice response unit (VRU) accessed and controlled by the transaction processor through the PSTN, the transaction processor transferring the incoming telephone call to the VRU;
    the VRU requesting and obtaining transactional data from the caller and overwriting at least a portion of the call information identifiers with repopulated data corresponding to the transactional data, said data defining repopulated data;
    a host processor that receives the obtained transactional data from the VRU, that selects an agent of the plurality of agents and that transfers a telephone number of the selected agent or selected agent group to the VRU;
    the VRU transferring the incoming telephone call back to the transaction processor such that the repopulated data is retained within the call information identifiers; and
    the transaction processor routing the transferred call to the agent station such that the repopulated data is provided to the agent station.

30. The system according to claim 29 further including a host processor operatively coupled to the VRU.

31. The system according to claim 29 wherein the VRU is interactive and requests the transactional data from the caller.

32. The system according to claim 29 wherein the transactional data is selected from the group consisting of account number, credit card number, social security number, name and address.

33. The system according to claim 29 wherein the VRU is operatively coupled to a voice recognition system.

34. The system according to claim 29 wherein if the transactional data provided by the caller exceeds a storage capacity of the call information identifiers, the repopulated data is in the form of a customer record key corresponding to the transactional data.

35. The system according to claim 34 further including the host processor operatively coupled to the VRU, the host processor providing the VRU with the customer record key.

36. The system according to claim 35 further including a database accessible by the host processor.

37. The system according to claim 34 wherein the repopulated data in the form of the customer record key provided to the agent station permits the agent station to access customer data corresponding to the customer.

38. In an automatic call distribution system adapted to connect a telephone call of a caller to one of a plurality of agents located at an agent station through a public switched telephone network (PSTN), a method of repopulating call information identifiers received from the PSTN, the method comprising the steps of:
    receiving the incoming telephone call from the PSTN;
    transferring the incoming call from the automatic call distribution system;
    obtaining transactional data relating to the telephone call;
    selecting an agent of the plurality of agents for handling the call based upon a business reason derived from the obtained transactional data;
    overwriting at least a portion of the call information identifiers with repopulated data corresponding to the transactional data;
    dialing a telephone number of the selected agent or selected agent group and transferring the incoming telephone call back to the automatic call distribution system along with the repopulated data retained within the call information identifiers using a hook transfer type of operation;
    routing the transferred call to the selected agent located at an agent station of the selected agent; and
    displaying the repopulated data on the agent station.

39. In an automatic call distribution system adapted to connect a telephone call of a caller to one of a plurality of agents located at an agent station through a public switched telephone network (PSTN), a method of repopulating call information identifiers received from the PSTN, the method comprising the steps of:
    receiving the incoming telephone call from the PSTN;
    transferring the incoming call from the automatic call distribution system;
    means for obtaining transactional data relating to the telephone call;
    means for selecting an agent of the plurality of agents for handling the call based upon a business reason derived from the obtained transactional data;
    means for overwriting at least a portion of the call information identifiers with repopulated data corresponding to the transactional data, said data defining repopulated data;
    means for dialing a telephone number of the selected agent or selected agent group and transferring the incoming telephone call back to the automatic call distribution system along with the repopulated data retained within the call information identifiers using a hook transfer operation;
    routing the transferred call to the selected agent located at an agent station of the selected agent; and
    displaying the repopulated data on the agent station.

* * * * *